（12）United States Patent
Yoshimura

(10) Patent No.: US 9,091,234 B2
(45) Date of Patent: Jul. 28, 2015

(54) HOUSING FOR VEHICLE COMPONENT

(71) Applicant: TOYOTA BOSHOKU KABUSHIKI KAISHA, Aichi-ken (JP)

(72) Inventor: Hiroyuki Yoshimura, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 66 days.

(21) Appl. No.: 14/055,073

(22) Filed: Oct. 16, 2013

(65) Prior Publication Data

US 2014/0124555 A1 May 8, 2014

(30) Foreign Application Priority Data

Nov. 5, 2012 (JP) ................................. 2012-243741

(51) Int. Cl.
*B01D 46/00* (2006.01)
*F02M 35/02* (2006.01)
*F02M 35/024* (2006.01)

(52) U.S. Cl.
CPC ....... *F02M 35/0201* (2013.01); *F02M 35/0245* (2013.01); *F02M 35/02491* (2013.01)

(58) Field of Classification Search
CPC ........ B01D 46/10; B01D 50/00; B01D 46/42; B01D 46/00; E05D 5/02
USPC ........ 55/385.3, 502, 423, 495, 497, 503, 493; 454/158; 123/198 E; 210/435
See application file for complete search history.

(56) References Cited

U.S. PATENT DOCUMENTS

| | | | | |
|---|---|---|---|---|
| 5,605,554 | A * | 2/1997 | Kennedy | 55/493 |
| 5,730,768 | A * | 3/1998 | Kaminaga et al. | 55/385.3 |
| 8,298,308 | B2 * | 10/2012 | Li | 55/385.3 |
| 8,394,158 | B2 * | 3/2013 | Shimomura et al. | 55/385.3 |
| 8,409,312 | B2 * | 4/2013 | Gorg et al. | 55/385.3 |
| 8,679,212 | B2 * | 3/2014 | Ushiyama et al. | 55/385.3 |
| 2012/0073252 | A1 * | 3/2012 | Lee et al. | 55/385.3 |
| 2012/0192535 | A1 * | 8/2012 | Schrewe | 55/385.3 |

FOREIGN PATENT DOCUMENTS

| | | |
|---|---|---|
| JP | 2003-239815 | 8/2003 |
| JP | 2010-242667 | 10/2010 |

* cited by examiner

*Primary Examiner* — Duane Smith
*Assistant Examiner* — Minh-Chau Pham
(74) *Attorney, Agent, or Firm* — Greenblum & Bernstein, P.L.C.

(57) ABSTRACT

A housing for a vehicle component includes a first case and a second case. The first case has an opening and a retainer hole at an edge of the opening. The second case has an opening and a protrusion at an edge of the opening. With the protrusion engaged with the retainer hole, the openings of the first case and the second case are selectively opened and closed by pivoting the second case with respect to the first case. The first case and the second case have separation portions. When the second case is pivoted in the opening direction, the separation portions engage with each other to move the first case and the second case relative to each other such that the protrusion is pulled out of the retainer hole.

9 Claims, 6 Drawing Sheets

HOUSING FOR VEHICLE COMPONENT

BACKGROUND OF THE INVENTION

The present invention relates to a housing that houses a vehicle component such as a filter of an automobile air cleaner.

Japanese Laid-Open Patent Publications No. 2003-239815 and No. 2010-242667 disclose conventional housings for automobile air cleaners.

Japanese Laid-Open Patent Publication No. 2003-239815 discloses a housing that has first and second cases each having an opening. A pair of loop-shaped members project from the edge of the opening of the first case. A pair of protrusions is formed from the edge of the opening of the second case. The protrusions are engageable with the inside of the loop-shaped members. Each protrusion has a hook portion at the distal end. The first case and the second case are secured to each other by engaging the protrusions with the loop-shaped members. In this state, the openings of the first case and the second case are selectively opened and closed by pivoting the second case relative to the first case. In a state in which the second case has been pivoted in the opening direction relative to the first case by a predetermined amount so that the openings of the cases are open, the protrusions are prevented from coming off the loop-shaped members by the hook portions on the protrusions being engaged with the loop-shaped members.

On the other hand, Japanese Laid-Open Patent Publication No. 2010-242667 discloses a housing that has first and second cases each having an opening. A pair of loop-shaped members is formed on the edge of the opening of the first case. Also, a pair of protrusions is formed on the edge of the opening of the second case. Engageable portions, which can be engaged with each other, are formed on the edges of the openings of both cases. The first case and the second case are secured to each other by engaging the protrusions with the inside of the loop-shaped members. In this state, the openings of the first case and the second case are selectively opened and closed by pivoting the second case relative to the first case. In this case, the engagement of the engageable portions maintains engagement of the protrusions with the loop-shaped members between the closed state and the open state of the first and second cases. Also, when the second case is moved diagonally upward relative to the first case after being pivoted in the opening direction relative to the first case by a predetermined angle or more, the engageable portions are disengaged from each other and the protrusions are pulled out of the loop-shaped members. This separates the first case and the second case from each other. Unless the protrusions are pulled out of the loop-shaped members, the engageable portions limit, within a predetermined angle range, pivoting motion of the second case in the opening direction to open the openings of the first case and the second case.

SUMMARY OF THE INVENTION

In the above described conventional configurations, when the second case has been pivoted in the opening direction relative to the first case by a predetermined angle, a further pivoting of the second case in the opening direction is restricted. Thus, for example, if an ordinary user who owns the vehicle inadvertently and excessively pivots the second case in the opening direction during maintenance for cleaning or replacing the air filter, hinges, which are formed by the loop-shaped members and the protrusions, receive an excessive force. This may break the hinges. Particularly, in some cases, no vehicle components exist on the pivoting path in the opening direction of the second case in the engine compartment, in which the air cleaner is mounted. In this case, the second case can be freely pivoted, and the above described drawback is therefore pronounced.

The present invention was made for solving the above problems in the prior art. It is an objective of the present invention to provide a housing for a vehicle component that prevents hinges between cases from being damaged when the cases are opened to an excessive degree.

To achieve the foregoing objective, and in accordance with one aspect of the present invention, a housing for a vehicle component having a first case and a second case is provided. The first case has an opening and a retainer hole at an edge of the opening. The second case has an opening and a protrusion at an edge of the opening. With the protrusion engaged with the retainer hole, the openings of the first case and the second case are selectively opened and closed by pivoting the second case with respect to the first case about the protrusion and the retainer hole in one of an opening direction and a closing direction. The first case and the second case have separation portions. When the second case is pivoted in the opening direction, the separation portions engage with each other to move the first case and the second case relative to each other such that the protrusion is pulled out of the retainer hole.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A housing for a vehicle component according to a first embodiment, which is a housing 11 for an automobile air cleaner, will be described with reference to the drawings.

Figure 1:
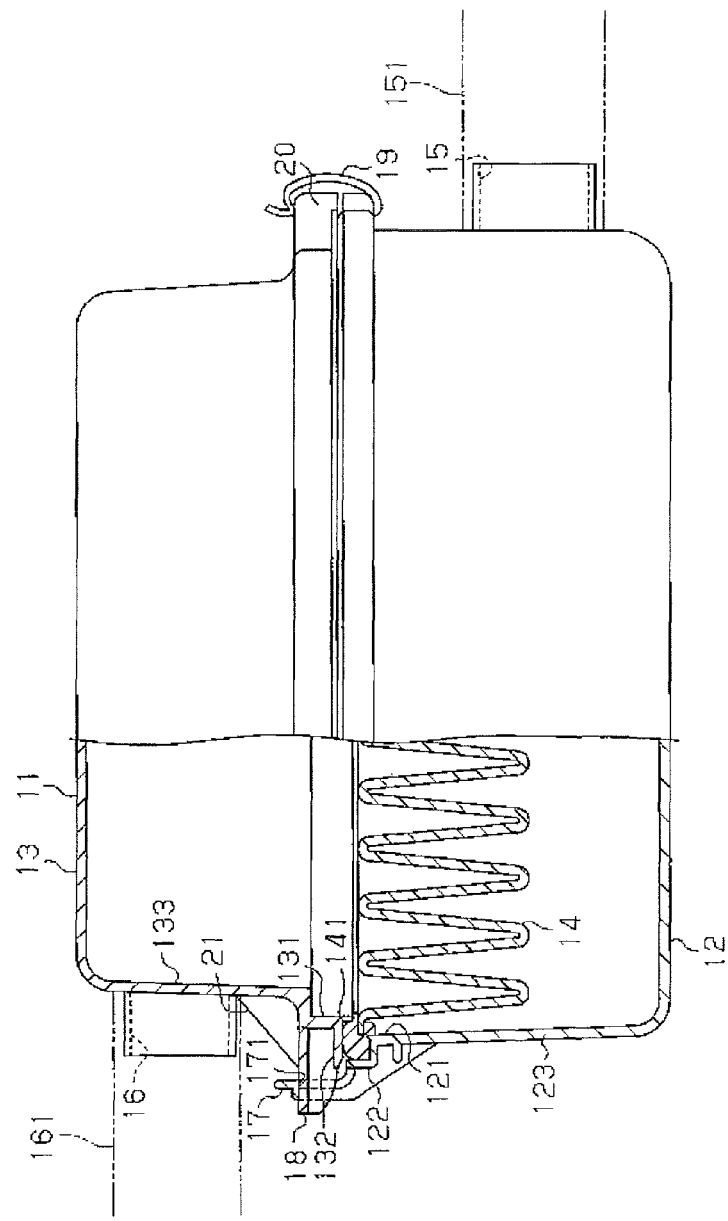
FIG. 1 is a front view, with a part cut away, illustrating an automobile air cleaner that uses a housing according to a first embodiment.
Figure 2:
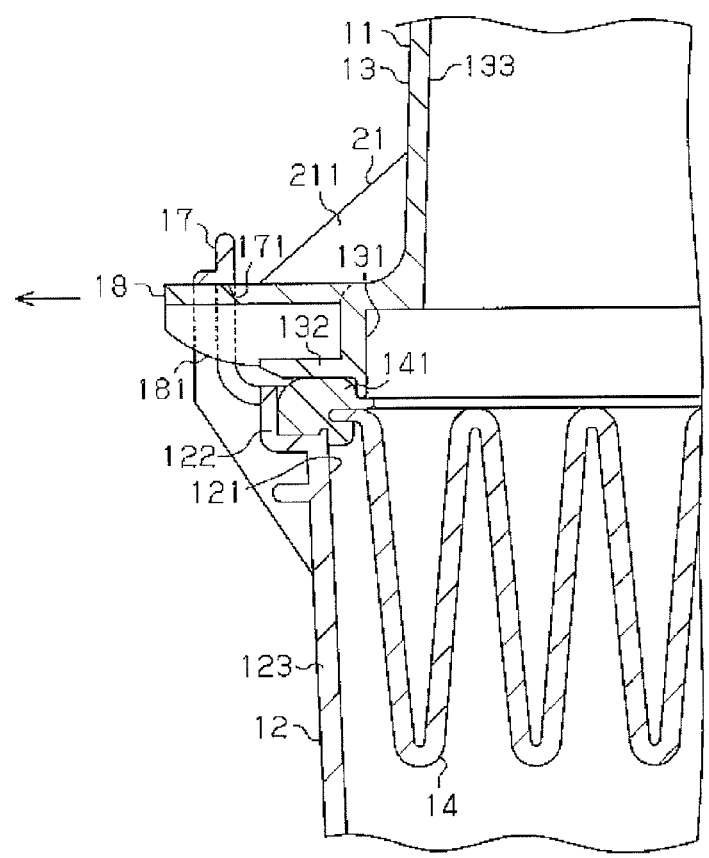
FIG. 2 is an enlarged partial cross-sectional view illustrating the air cleaner of FIG. 1.

As shown in FIGS. 1 and 2, the air cleaner housing 11 of the first embodiment includes a lower first case 12, which has an opening 121 at the top, and an upper second case 13, which has an opening 131 at the bottom. Flanges 122, 132 are formed at the opening 121 of the first case 12 and at the opening 131 of the second case 13, respectively. A vehicle component, which is an air filter 14 in the present embodiment, is accommodated between the first case 12 and the second case 13. The air filter 14 has a sealing portion 141 made of elastomeric foam at the outer periphery. To ensure sealing performance, the sealing portion 141 is held between the flanges 122 and 132 in a compressed state.

As shown in FIG. 1, an inlet 15 is formed in a side wall 123 of the first case 12. The inlet 15 is coupled to an intake duct 151 for introducing the atmospheric air. An outlet 16 is formed in a side wall 133 of the second case 13. The outlet 16 is coupled to a supply duct 161, which is connected to an engine (not shown). The supply duct 161 is made of a flexible material such as rubber or elastomer. During operation of the engine, air is drawn into the first case 12 from the inlet 15 via the intake duct 151. After being filtered by the air filter 14, the air is conducted to the engine from the outlet 16 via the supply duct 161.

Figure 3:
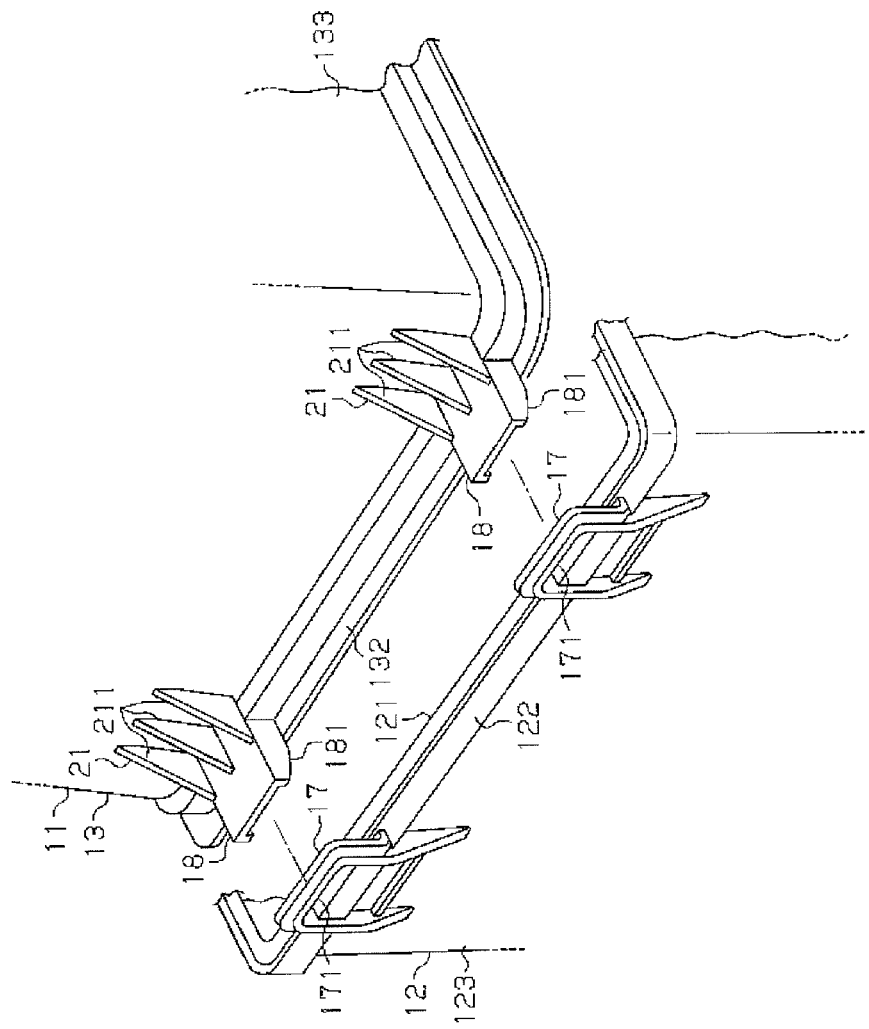
FIG. 3 is a partial perspective view illustrating the housing of the air cleaner in a dismantled state.

As shown in FIGS. 2 and 3, a pair of upward projecting loop-shaped members 17 is formed on a side of the opening 121 of the first case 12. A retainer hole 171 having a substantially rectangular cross-sectional shape is formed in each loop-shaped member 17. A pair of outward protrusions 18 is formed on a side of the opening 131 of the second case 13. The protrusions 18 are engageable with the retainer holes 171 of the loop-shaped members 17 and each have an inverted U-shaped cross section. A clearance portion 181 is formed on the lower side of the distal end of each protrusion 18. The clearance portion 181 is arcuately curved upward so that the vertical dimension of the protrusion 18 decreases toward the distal end. When the second case 13 is at a closed position, the upper surface of each protrusion 18 engages with the inner peripheral surface of the retainer hole 171 of the corresponding loop-shaped member 17. The first case 12 and the second case 13 are therefore coupled to each other. At this time, by pivoting the second case 13 in one of an opening direction and a closing direction with respect to the first case 12, the openings 121, 131 of the cases 12, 13 can be selectively opened or closed. In this case, the compression reaction force of the sealing portion 141 presses the protrusions 18 against the upper inner surfaces of the retainer holes 171.

As shown in FIG. 1, a pair of pivoting clamps 19 attached to the edge of the opening 121 of the first case 12 on the side opposite to the loop-shaped members 17. Catch portions 20 are formed to protrude from the opening 131 of the second case 13 to be engaged with the clamps 19. When the second case 13 has been pivoted with respect to the first case 12 to the closed state, the second case 13 is clamped in the closed state with respect to the first case 12 by engaging the clamps 19 with the catch portions 20. In this manner, the clamps 19 and the catch portions 20 form a lock mechanism that locks the first case 12 and the second case 13 in the closed state.

As shown in FIGS. 1 to 3, a pair of engageable portions 21 is formed integrally with the outer side surface of the second case 13. The engageable portions 21 are located at positions that correspond to the protrusions 18 and engageable with the side surfaces of the distal ends of the loop-shaped members 17 of the first case 12. Each engageable portion 21 is formed by three parallel triangular plate-like ribs 211, which are formed between the side wall 133 of the second case 13 and the corresponding protrusion 18. When the second case 13 is pivoted in the opening direction about the hinges, which are formed by the protrusions 18 and the retainer holes 171, and the opening degree exceeds a predetermined amount, each engageable portion 21 contacts the side surface of the distal end of the corresponding loop-shaped member 17. As the second case 13 is pivoted further in the opening direction, the first case 12 and the second case 13 are moved relative to each other such that the protrusions 18 are pulled out of the retainer holes 171. The side surfaces of the distal ends of the loop-shaped members 17 serve as first engageable portions, and the engageable portions 21 serve as second engageable portions. The first and second engageable portions form separation portions.

An operation of the air cleaner housing thus constructed will now be described.

Figure 4A:
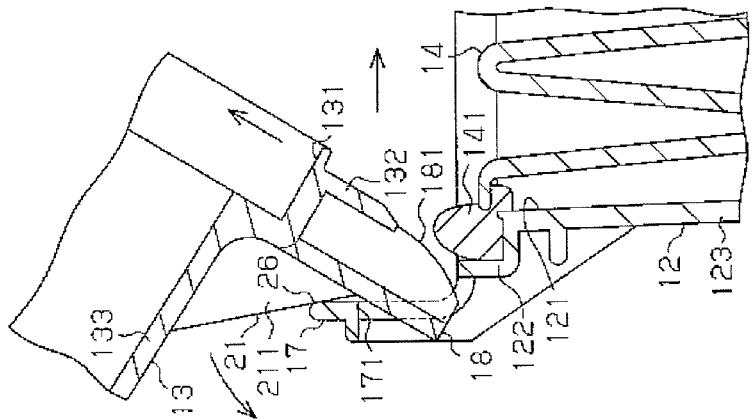
FIGS. 4A to 4C are partial cross-sectional views showing sequential states in which the openings of the first and second cases of the housing are being opened.

To clean or replace the air filter 14 accommodated in the housing 11 in the state shown in FIGS. 1 and 4A, the clamps 19 are disengaged from the catch portions 20, so that the second case 13 is unlocked from the first case 12.

Figure 4B:
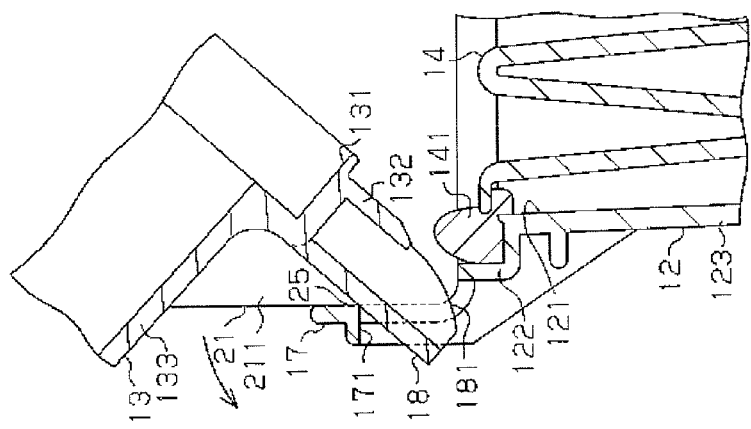

In this state, the second case 13 is pivoted in the opening direction about the hinges, which are formed by the protrusions 18 and the retainer holes 171, such that the catch portions 20 of the second case 13 separate away from the clamps 19. That is, the second case 13 is pivoted about contacting parts 25 between the protrusions 18 and the retainer holes 171. At this time, the opening 121 of the first case 12 is opened. Then, as shown in FIG. 4B, a side surface next to the apex of each engageable portion 21 is brought into a surface contact with the side surface of the distal end of the corresponding loop-shaped member 17, which restricts the further pivoting of the second case 13 in the opening direction. In this state, the air filter 14 can be cleaned or replaced. Also, the interior of the first case 12 can be cleaned.

Figure 4C:
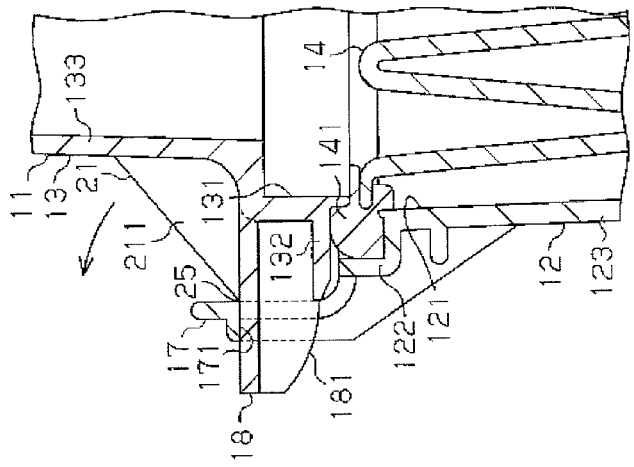

If the second case 13 is inadvertently and excessively pivoted in the opening direction from the state illustrated in FIG. 4B, the outer side surface of each engageable portion 21 of the second case 13 is brought into point contact with a contacting part 26 on the upper edge of the corresponding loop-shaped member 17 as illustrated in FIG. 4C, so that the second case 13 is pivoted in the opening direction about the contacting parts 26. That is, the center of pivoting motion of the second case 13 is switched from the contacting parts 25 to the higher contacting parts 26, which are shown FIG. 4C. Accordingly, as indicated by arrows in FIG. 4C, the protrusions 18 are pivoted and pulled out of the retainer holes 171.

Figure 5A:
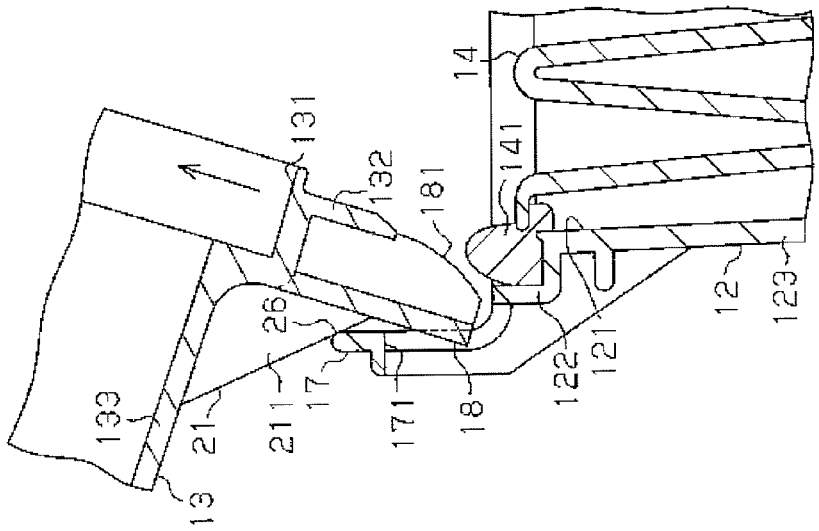
FIGS. 5A and 5B are partial cross-sectional views subsequent to the state of FIG. 4C, showing sequential states in which the openings of the first and second cases of the housing are being opened.
Figure 5B:
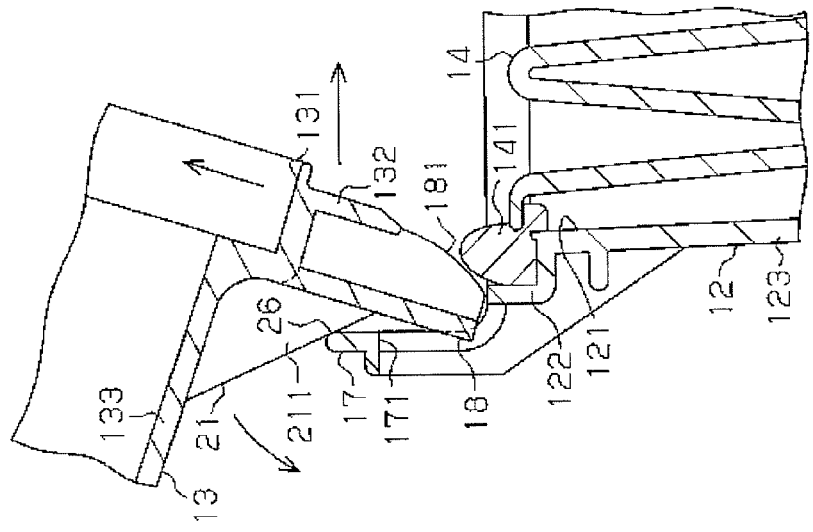

If the second case 13 is pivoted further in the opening direction, the protrusions 18 are pulled out of the retainer holes 171, while the contacting parts 26, which are pivot center of the second case 13, are moved to lower sections of the engageable portions 21, as shown in FIG. 5A. At this time, since the clearance portions 181 are formed on the lower sides of the distal ends of the protrusions 18, the lower sides of the distal ends of the protrusions 18 do not contact the lower edges of the retainer holes 171 of the first case 12. Thereafter, as shown in FIG. 5B, as the second case 13 is pivoted in the opening direction, the protrusions 18 are pulled out upward from the retainer holes 171. Thus, even if the second case 13 is inadvertently pivoted further in the opening direction from a predetermined open state, the hinges, which are formed by the retainer holes 171 and the protrusions 18, do not receive an excessive force.

The first embodiment has the following advantages.

(1) In the vehicle component housing, the first case 12 and the second case 13 have the separation portions. When the second case 13 is pivoted by an amount greater than or equal to a predetermined amount in the opening direction, the separation portions contact each other to move the first case 12 and the second case 13 relative to each other such that the protrusions 18 are pulled out of the retainer holes 171.

Therefore, when the opening angle between the cases 12 and 13 is inadvertently excessively increased in the housing 11, the hinges, which are formed by the retainer holes 171 and the protrusions 18, do not receive an excessive force. The hinges are thus prevented from being damaged. Further, since the clearance portions 181 are formed on the lower sides of the distal ends of the protrusions 18, the protrusions 18 and the first case 12 are prevented from contacting each other. This prevent the protrusions 18 and the first case 12 from being damaged by such contact, and allows the second case 13 to be smoothly pivoted in the opening direction.

(2) In the vehicle component housing, the retainer holes 171 are formed in the loop-shaped members 17 protruding from the first case 12, and the engageable portions 21 are formed by the ribs 211, which are integrally formed with the outer surface of the second case 13 to face the loop-shaped members 17. This simplifies the structure without increasing the number of components.

Since each engageable portion 21 is formed by thin ribs 211, shrinkage after molding (sink marks) is suppressed. This improves the dimension accuracy of the second case 13.

(3) In the vehicle component housing, the ribs 211 are formed integrally with the protrusions 18 and the side wall 133 of the second case 13. Therefore, although the protrusions 18 have a cantilever-like structure, the protrusions 18 are robust.

Second Embodiment

The second embodiment will now be described.

Figure 6:
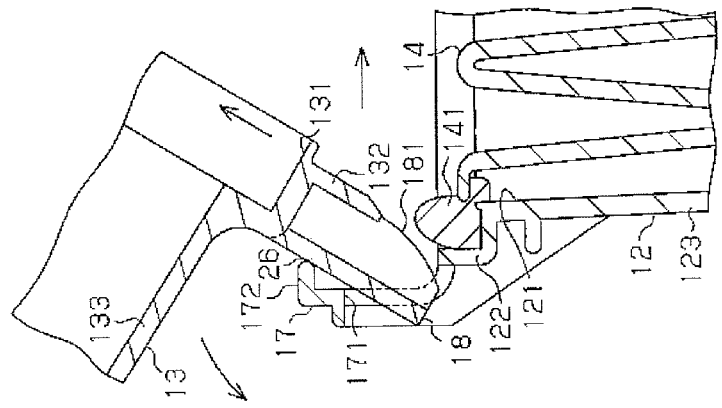
FIG. 6 is a partial cross-sectional view showing a state in which the openings of the first and second cases of a housing according to a second embodiment are being opened.
Figure 7:
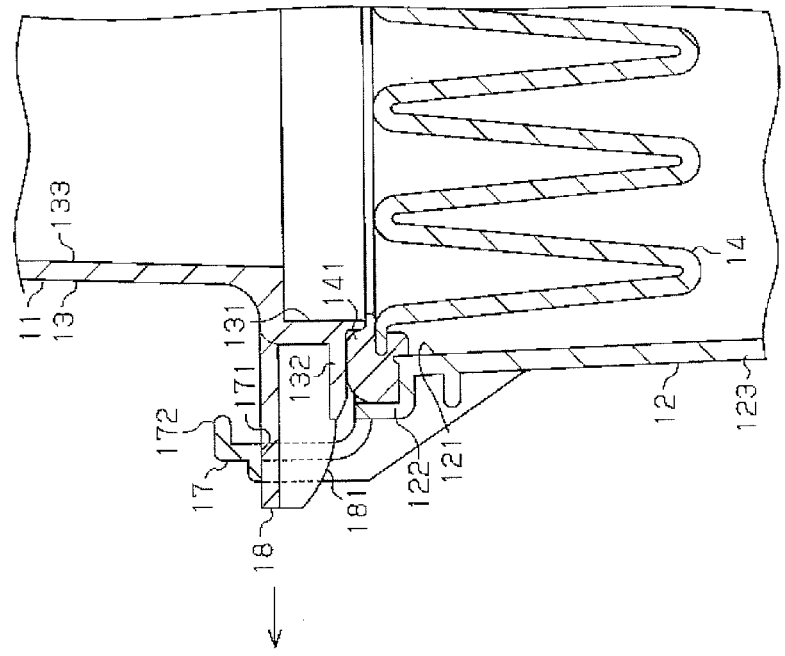
FIG. 7 is a partial cross-sectional view subsequent to the state of FIG. 6, showing a state in which the openings of the first and second cases of the housing are being opened.

As shown in FIGS. 6 and 7, the ribs 211 are not provided in the second embodiment. An engageable projection 172 is integrally formed with the side wall of the distal end of each loop-shaped member 17. The upper surfaces of the protrusions 18 form first engageable portions, which function as separation portions, and the engageable projections 172 form second engageable portions, which function as separation portions. When the second case 13 is excessively pivoted in the opening direction as shown in FIG. 7, the upper surface of each protrusion 18 contacts the corresponding engageable projection 172, so that the second case 13 receives a force that act to pull the protrusions 18 out of the retainer holes 171 of the loop-shaped members 17.

The second embodiment therefore provides the same advantages as the advantages (1) and (2) of the first embodiment.

Modifications

The above described embodiments may be modified as follows.

In place of the ribs 211, each engageable portion 21 may be formed by a protrusion having substantially the same width as the protrusion 18.

The vehicle component housing may be applied to a housing other than an air cleaner housing. For example, the vehicle component housing may be applied to an electric junction box for accommodating fuses and other components.

The clearance portions 181 may be formed on the outer edge of the first case 12. For example, parts of the first case 12 that correspond to the protrusions 18 may be recessed to avoid contact with the protrusions 18.

Therefore, the present examples and embodiments are to be considered as illustrative and not restrictive and the invention is not to be limited to the details given herein, but may be modified within the scope and equivalence of the appended claims.

The invention claimed is:

1. A housing for a vehicle component, comprising:
a first case having an opening and a retainer hole having an inner peripheral surface, the retainer hole being provided at an edge of the opening; and
a second case having an opening and a protrusion having an outer peripheral surface, the protrusion being provided at an edge of the opening, wherein
the housing is opened and closed by pivoting the second case with respect to the first case about the protrusion and the retainer hole in one of an opening direction and a closing direction,
at least one of the outer peripheral surface of the protrusion and the inner peripheral surface of the retainer hole has a clearance portion to prevent damage to the retainer hole and the protrusion when the protrusion is pulled out of the retainer hole in the opening direction,
the first case and the second case have separation portions that contact each other to prevent excessive force from acting on the retainer hole and the protrusion when the protrusion is pulled out of the retainer hole in the opening direction, and
when the second case is pivoted in the opening direction to pull the protrusion out of the retainer hole, the separation portions engage each other such that the clearance portion and the separation portions, together, prevent the outer peripheral surface of the protrusion and the inner peripheral surface of the retainer hole from contacting each other.

2. The housing for the vehicle component according to claim 1, wherein
a loop-shaped member protrudes from the first case,
the retainer hole is defined inside the loop-shaped member, and
the separation portions include a first engageable portion provided in the loop-shaped member and a second engageable portion provided in the second case.

3. The housing for the vehicle component according to claim 2, wherein the second engageable portion is integrally provided with the protrusion and a side wall of the second case.

4. The housing for the vehicle component according to claim 3, wherein the second engageable portion is a rib.

5. The housing for the vehicle component according to claim 1, wherein
the separation portions are provided on edges of the openings of the first and second cases,
a lock mechanism is provided at parts of the edges of the openings of the first and second cases that face the separation portions, and
the lock mechanism is configured to lock the first case and the second case in a closed state.

6. The housing for the vehicle component according to claim 1, wherein
the first and second cases have a flange,
an air filter having a sealing portion is accommodated between the first case and the second case, and
the sealing portion of the air filter is held between the flanges of the first and second cases when the housing is closed.

7. The housing for the vehicle component according to claim 1, wherein the protrusion is rigidly connected to the second case.

8. The housing for the vehicle component according to claim 3, wherein the protrusion is rigidly connected to the side wall.

9. The housing for the vehicle component according to claim 6, wherein when the housing is closed, a compression reaction force of the sealing portion presses the protrusion against the retainer hole.

\* \* \* \* \*